(12) United States Patent
Atia et al.

(10) Patent No.: US 7,375,812 B2
(45) Date of Patent: May 20, 2008

(54) METHOD AND SYSTEM FOR REDUCING PARASITIC SPECTRAL NOISE IN TUNABLE SEMICONDUCTOR SOURCE SPECTROSCOPY SYSTEM

(75) Inventors: Walid A. Atia, Lexington, MA (US); Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 212 days.

(21) Appl. No.: 11/062,896

(22) Filed: Feb. 22, 2005

(65) Prior Publication Data

US 2006/0187457 A1  Aug. 24, 2006

(51) Int. Cl.
  *G01N 21/00* (2006.01)
(52) U.S. Cl. .................................... 356/432
(58) Field of Classification Search ................ 356/432, 356/435, 300–334, 236; 250/228, 205
  See application file for complete search history.

(56) References Cited

U.S. PATENT DOCUMENTS

| | | | | |
|---|---|---|---|---|
| 4,879,761 | A * | 11/1989 | Webb | 398/180 |
| 4,932,779 | A * | 6/1990 | Keane | 356/319 |
| 5,164,586 | A | 11/1992 | Hohberg et al. | |
| 5,384,641 | A * | 1/1995 | Imura | 356/446 |
| 5,751,418 | A * | 5/1998 | Kimura et al. | 356/319 |
| 6,222,623 | B1 * | 4/2001 | Wetherell | 356/236 |
| H001965 | H * | 6/2001 | Burns et al. | 372/22 |
| 6,339,603 | B1 | 1/2002 | Flanders et al. | |
| 6,373,632 | B1 | 4/2002 | Flanders | |
| 6,608,711 | B2 | 8/2003 | Flanders et al. | |
| 6,798,505 | B2 | 9/2004 | Karpol et al. | |
| 6,813,068 | B2 * | 11/2004 | Hamamoto | 359/344 |
| 6,924,891 | B2 | 8/2005 | Karpol et al. | |
| 2002/0167669 | A1 * | 11/2002 | Schwarz | 356/446 |
| 2004/0196874 | A1 * | 10/2004 | Spiegelberg et al. | 372/6 |
| 2004/0233428 | A1 * | 11/2004 | Hart et al. | 356/319 |
| 2005/0008290 | A1 | 1/2005 | Miron | |
| 2005/0264808 | A1 * | 12/2005 | Wang | 356/328 |
| 2006/0082777 | A1 * | 4/2006 | Drennen et al. | 356/432 |
| 2006/0152729 | A1 * | 7/2006 | Drennen et al. | 356/432 |

OTHER PUBLICATIONS http://web.archive.org/web/20030416033137/www.labsphere.com/tech_info/docs/IS_Theory_Application.pdf ☐☐☐☐ See V below for explanation of timestamp in the URL.*

(Continued)

*Primary Examiner*—Tarifur Chowdhury
*Assistant Examiner*—Jonathon D Cook
(74) *Attorney, Agent, or Firm*—Houston Eliseeva LLP (57) ABSTRACT

A spectroscopy system comprises a tunable semiconductor laser, such as an external cavity laser, that generates a tunable signal. A detector is provided for detecting the tunable signal after interaction with a sample. In this way, the system is able to determine the spectroscopic response of the sample by tuning the laser of the scan band and monitoring the detector's response. An integrating device, such as an integrating sphere, is interposed optically between the tunable semiconductor laser and the detector. This integrating device is used to mitigate the effects of parasitic spectral noise, such as noise that is generated by speckle or the combination of single-and multi-mode optical fibers in the transmission link between the tunable semiconductor laser and the detector.

30 Claims, 4 Drawing Sheets

OTHER PUBLICATIONS

Pay attention to the date code embedded in the archived url. This is the list of numbers in the middle; it translates as yyyymmddh-hmmss. For example in the url http://web.archive.org/web/20000229123340/http://www.yahoo.com/the date the site was crawled was Feb. 29, 2000 at 12:33 and 40 seconds.*

U.S. Appl. No. 11/018,687, filed Dec. 21, 2004, Flanders et al.

Dingel, Benjamin, et al., "Speckle-free image in a laser-diode microscope by using the optical feedback effect," Optics Letters, vol. 18, No. 7, Apr. 1, 1993, pp. 549-551.

Wang, Lingli, et al., "Speckle reduction in laser projection systems by diffractive optical elements," Applied Optics, vol. 37, No. 10, Apr. 1998, pp. 1770-1775.

Lodahl, P. et al., "Transport of quantum noise through random media," Complex Photonic Systems, Department of Science and Technology and MESA+ Research Institute, University of Twente, The Netherlands, Nov. 26, 2004, pp. 1-12.

Pike Technologies Newsletter, vol. 9, No. 2, note pp. 2 and 3, Summer 2004, pp. 1-4.

Tech Guide, "A Guide to Integrating Sphere Theory and Applications," Labsphere (1998).

Anderson, Valerie E., et al., "Highly Stable, Monochromatic and Tunable Optical Radiation source and its Application to High Accuracy Spectrophotometry," Applied Optics, vol. 31, No. 4, Feb. 1, 1992, pp. 536-545.

Corredera, P., et al., "Characterization of a High Power and High Accuracy Intergrating Sphere Radiometer for Fiber Applications," Optical Fiber Measurements, 2004. Technical digest: Symposium on Boulder, CO, USA. Sep. 28-30, 2004. Piscataway, NJ, USA, IEEE, Sep. 28, 2004, pp. 149-152.

International Preliminary Report on Patentability from PCT/US2006/000823, filed on Jan. 10, 2006.

* cited by examiner

METHOD AND SYSTEM FOR REDUCING PARASITIC SPECTRAL NOISE IN TUNABLE SEMICONDUCTOR SOURCE SPECTROSCOPY SYSTEM

BACKGROUND OF THE INVENTION

A major source of parasitic spectral distortion in spectroscopy systems arises from speckle. This effect is observable in the emission of lasers: a laser beam observed scattered from a surface, such as a piece of paper, will appear to have randomly distributed bright speckles or dots, which can change with time and wavelength. This speckle pattern is the result of phase interference patterns that form at the detector plane, such as the eye observing the laser spot, and is partly a function of the minimum spectral resolution of the system and the roughness of the scattering (reflecting) surface at which the laser emission is directed. The speckle phenomenon is caused by the simultaneous spatial and spectral coherence of the light source, where spatial coherence refers to the small spatial extent, or diameter, of the light source, and spectral coherence refers to the small spectral width of the light source. In spectroscopy systems, spectral coherence of the light source is determined by the spectral resolution of the system, whether the spectral selection is done before or after interaction with the sample, as in pre-dispersive or post-dispersive spectroscopy systems, respectively.

In the context of spectroscopy systems, the speckle affects the total power detected by a finite aperture, and/or finite numerical aperture, detector. Specifically, when speckle is present, the detected power is a function not only of the total intensity of the beam but how the speckle spots are distributed over the detector aperture and how those spots change with time and wavelength.

While speckle can even be observed in nominally incoherent (low coherence) sources, the biggest challenges arise when using coherent sources, such as lasers. The high coherence of the sources increases the contrast in the speckle pattern. This results in increased signal distortion in the detector's response. Since the speckle pattern changes apparently randomly with the changes in wavelength for a tunable laser in a tunable source spectroscopy system, the speckle has the effect of generating spectral distortion that erodes the signal to noise ratio (SNR) of the spectroscopy system. Whereas noise varies randomly with time and thus time averaging reduces noise and improves signal-to-noise ratio of the system, the speckle induced signal distortion does not vary randomly with time and thus time averaging does not reduce speckle signal distortion.

BRIEF SUMMARY OF THE INVENTION

Another source of phase interference that can result in parasitic spectral noise in spectroscopy systems arises when moving between single spatial mode fiber (SMF) and multi spatial mode fiber (MMF), such as when launching light from single-mode fiber into multi-mode fiber. Spectral distortion results from small changes in how the tunable signal is launched and propagates in the multi-mode fiber. Very small changes in the interface between the fibers, as well as small physical motions or temperature changes of the multi-mode fiber, change excitation amplitudes and phases of the spatial modes in the multi-mode fiber. This will cause phase interference noise at the finite aperture detector.

These problems of phase interference noise are most extreme in the context of semiconductor laser sources. These sources can emit spectrally, or temporally, coherent light. Further, these semiconductor laser sources have high spatial coherence because many semiconductor lasers only operate in a single or possibly only a few spatial modes. Therefore, speckle-induced spectral distortion can arise as the source light is detected after it interacts with a spatially-extended scattering sample. Moreover, in these systems, the light from the semiconductor laser sources is typically coupled into single-mode fiber and then into multi-mode fiber, or less commonly, directly into multi-mode fiber. As a result, phase interference noise can further arise from small changes in amplitude and phase of the modes of the MMF.

In general, according to one aspect, the invention features a spectroscopy system. This spectroscopy system comprises a tunable semiconductor laser that generates a tunable signal. The semiconductor source output is typically coupled to a single-mode fiber. A detector is provided for detecting the tunable signal after interaction with a sample. In this way, the system is able to determine the spectroscopic response of the sample by tuning the laser over the scan band and monitoring the detector's response.

According to the invention, an integrating device is interposed optically between the tunable semiconductor laser and the detector. This integrating device is used to mitigate the effects of parasitic speckle noise, such as noise that is generated by sample-scattering speckle or the combination of single- and multi-mode optical fibers in the transmission link between the tunable semiconductor laser and the detector.

In a preferred embodiment, the tunable semiconductor laser comprises an external cavity tunable laser that includes a semiconductor optical amplifier gain medium and a laser tuning element for selecting and tuning a spectral band of the emission of the semiconductor optical amplifier to generate the tunable laser signal. In one implementation, the semiconductor optical amplifier comprises a reflective rear facet and an antireflective-coated front facet. In some implementations, the laser tuning element comprises a tunable filter such as a micro-electromechanical system Fabry-Perot tunable filter. In an alternative implementation, the laser tuning element is a grating, however.

In some applications, the detector comprises a single element detector. But in other examples, the detector can be a detector element array such as a charge coupled device or InGaAs array.

In the current embodiment, the integrating device comprises a highly diffuse reflective element in which the tunable signal undergoes multiple diffuse reflections to be temporally and spatially integrated. In one specific example, the integrating device is an integrating sphere. This can be a solid sphere with a highly diffuse reflective coating or a hollow sphere that is formed in a highly diffuse reflective material.

One typical application for the present invention is in a spectroscopy system that uses multiple fiber links. In one example, a first fiber link, typically a single-mode fiber, extends between the tunable semiconductor laser and the integrating device and is used to illuminate a scattering sample under observation. A second optical fiber, typically a multimode fiber, is used to collect the light scattered from the sample and extends between the integrating device and the detector. In another example, a first fiber link, typically a single-mode fiber, extends between the tunable semiconductor laser and the integrating device, while the second optical fiber link, typically a multimode fiber, extends between the integrating device and the sample. In this application, the integrating device couples the single mode fiber to the multi-mode fiber, where it destroys spatial coherence of the source and decreases any spectral artifacts that arise from the direct launching of the single-mode fiber output into the multi-mode fiber.

In one specific embodiment, power detectors and/or wavelength reference detectors are used in conjunction with the integrating device. Specifically, they can be mounted on the integrating device to detect the power of the tunable signal in the integrating device and also the wavelength of the tunable signal in the integrating device. In this way, power and wavelength monitoring taps are made part of the integrating device for improved operation and ease of assembly.

In general, according to another aspect, the invention features a spectroscopy system that comprises at least first and second tunable semiconductor lasers. In this example, the integrating device is interposed optically between the tunable semiconductor lasers and the sample. The integrating device functions to combine the first tunable signal and the second tunable signal for transmission on a common output fiber. In this way, the integrating device further functions as a combiner for more than one, such as two, three, four, or more, semiconductor laser devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWING(S)

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
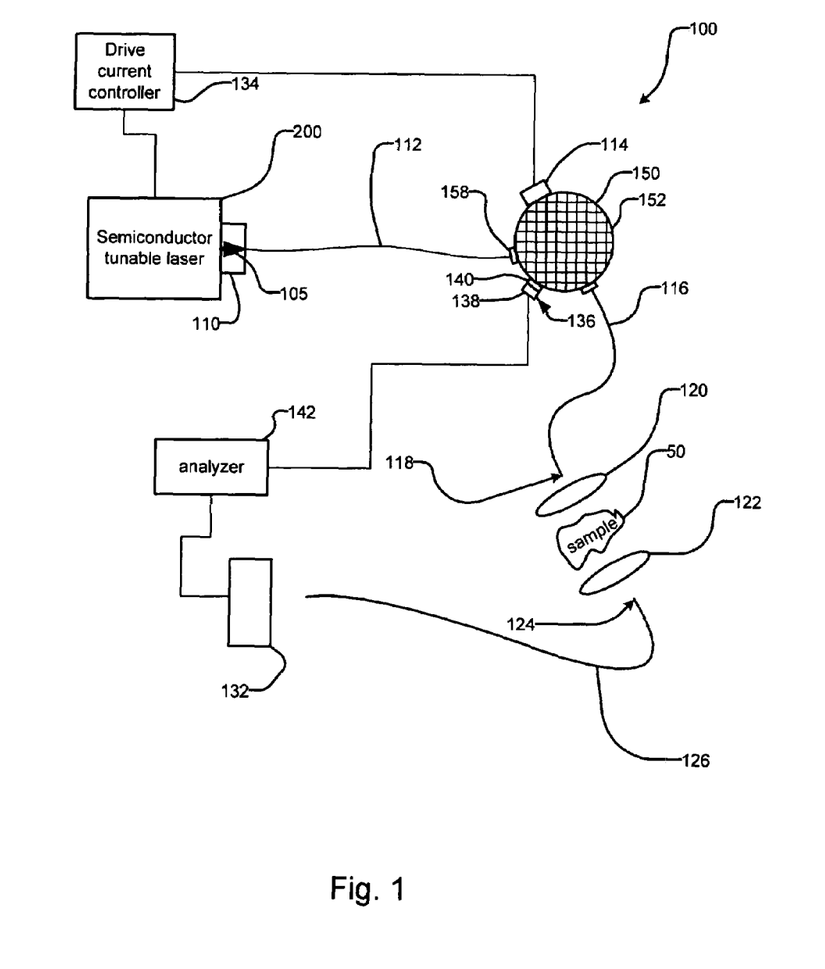
FIG. 1 is a schematic diagram showing a spectroscopy system according to a first embodiment of the present invention.

FIG. 1 illustrates a spectroscopy system 100, which has been constructed according to the principles of the present invention.

Generally, the system 100 includes a semiconductor tunable laser 200. This semiconductor tunable laser has a semiconductor gain medium, such as semiconductor optical amplifier. Often these semiconductor gain mediums emit light in only one or a few spatial modes and are fiber coupled. In the example, the generated tunable optical signal 105 is coupled into an optical fiber 112 by a coupler 110.

Because of the limited number of spatial modes of the semiconductor tunable laser 200, the optical fiber 112 is often a single mode fiber. Thus, it only supports and propagates a single spatial mode.

In one further implementation, the optical fiber 112 may further be polarization controlling fibers, such as polarization maintaining or polarization stripping (only propagates a single polarization) fiber. Specifically, such a system is illustrated in US2006/0132782A1, U.S. patent application Ser. No. 11/018,687, filed on Dec. 21, 2004, which is incorporated herein in its entirety by this reference. The use of polarization controlling fiber reduced polarization dependant loss, which increases the performance of these systems.

The optical fiber 112 from the semiconductor tunable laser 200 transmits the tunable signal 105 to an integrating device 150. Specifically, in one example, this integrating device 150 is an integrating sphere and the tunable signal is launched into the sphere via a coupler 158. These devices are used to integrate the optical signals typically both spatially and temporally. The optical signal propagates in the sphere, typically undergoing many reflections at an often diffusely reflecting surface 152 of the sphere 150. The optical signal 105 is then coupled into an output fiber 116.

The multiple diffuse reflections in the sphere 150 have the effect of integrating the tunable signal temporally and spatially, destroying or substantially destroying its spatial coherence to fill or excite all of the spatial modes of the output multi-mode fiber 116.

In one implementation, the integrating device 150 is a hollow integrating sphere. Specifically, in this example, the integrating device comprises a hollow region formed within a block of a reflective material such as Spectralon material. This material provides diffuse reflection over an extremely large bandwidth covering the infrared, visible, and ultraviolet regions of the spectrum. Its reflectance is generally >99% from 400-1500 nanometers (nm) and >95% between 250-2500 nm.

In another example, the integrating device 150 comprises a solid material that is transmissive to the tunable signal 105. Preferably, the material has a low absorption and a relatively high index of refraction. In one example, the integrating device is fabricated from a sphere of silicon, gallium phosphide, or zinc sulfide. The surface of the integrating device is then provided with a, preferably diffusely, reflective coating.

In other examples, the index mismatch between the integrating device and the surrounding environment is used to provide for internal reflection.

In one embodiment, the integrating device 150 also functions as a substrate or platform for detecting the power and/or wavelength of the tunable optical signal 105. Specifically, in one example, a power detector 114 is optically coupled to the integrating device 150. In one example, it is mounted to an outer surface 152 of the integrating device 150. As a result, the power detector 114 is able to detect the magnitude of the tunable optical signal 105. In one example, this information is provided to a drive current controller 134 that controls the power or current supplied to the semiconductor tunable laser 200, which can thereby be used to stabilize the magnitude of the tunable optical signal 105. In another example, the signal power information is used to modulate an optical signal modulator, such as an attenuator, to stabilize the signal 105.

In another example, a wavelength detector 136 is further coupled to the integrating device 150. In one example, the wavelength detector 136 is also mounted on the outer surface 152 of the integrating device 150. In one example, it includes an electro-optical detector 138 and a wavelength reference element 140, such as an etalon.

The power detected by the wavelength detector 136 is provided to an analyzer 142 or alternatively used for feedback control of the semiconductor tunable laser 200. This information enables wavelength calibration by detecting the precise instantaneous wavelength of the tunable optical signal 105.

The light from the integrating device 150 in one example is coupled into an output, typically multi-mode, fiber 116 that conveys light to the sample 50, for example. In one example, the light is emitted from an endface 118 of the output fiber 116 and possibly collimated or focused by a refractive optical element, such as a lens 120. As a result, the tunable optical signal 105 is transmitted to the sample 50 to interrogate the transmission or diffuse reflectance spectrum of the sample 50.

The use of the integrating device 150 minimizes the spectral artifacts that arise in the direct coupling between the single-mode fiber 112 and the multi-mode fiber 116. The integrating device 150 serves to destroy the spatial coherence of the excitation source and to fill the multiple spatial modes of the multi-mode fiber 116 in a consistent and reproducible fashion that is stable over time.

In the illustrated embodiment, light transmitted through the sample or reflected by the sample 50 is collected possibly by another refractive element 122 and coupled into the endface 124 of a detector side optical fiber 126, which is typically multi-mode. In the illustrated example, the detector side fiber conveys the tunable signal from the sample to a detector 132. In the illustrated example, the analyzer 142 is used to monitor the output of the detector.

Figure 2:
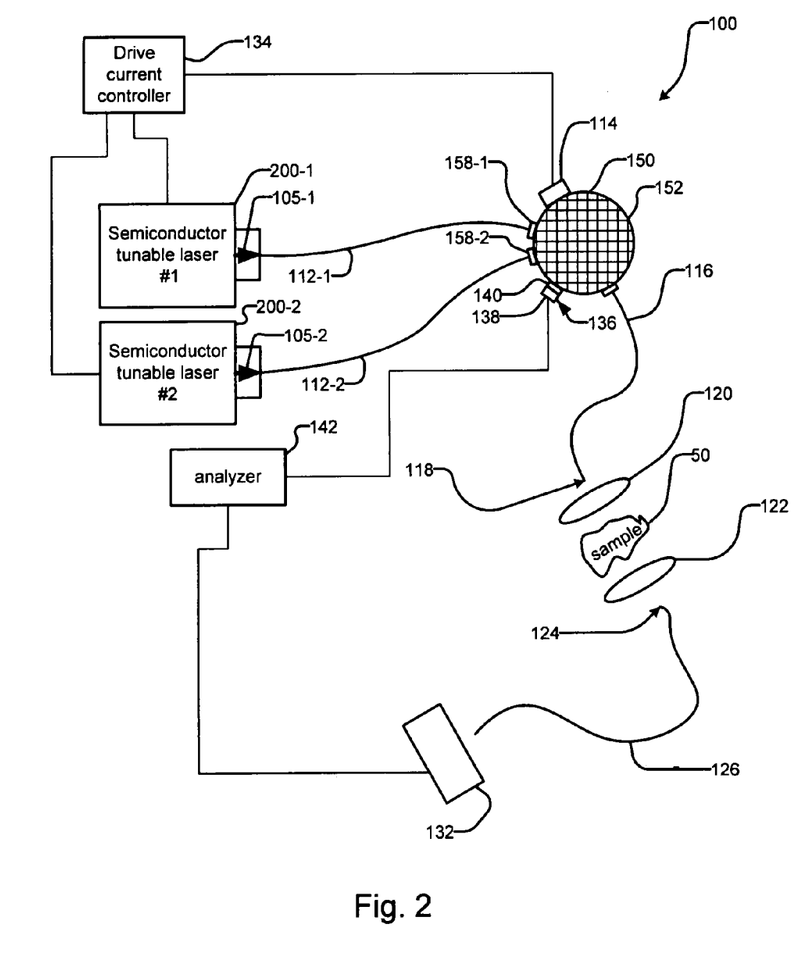
FIG. 2 is a schematic diagram showing a second embodiment of the spectroscopy system according to the present invention, providing for two or more semiconductor tunable lasers.

FIG. 2 illustrates an alternative embodiment in which the integrating device 150 is further used as a combiner to combine the tunable signal output generated by multiple semiconductor tunable lasers.

Specifically, in this embodiment, a first semiconductor tunable laser 200-1 and a second semiconductor laser 200-2 couple respective tunable optical signals 105-1 and 105-2 into a common integrating sphere 150 via fibers 112-1 and 112-2 and couplers 158-1 and 158-2.

The resulting combined tunable optical signal is transmitted on the output fiber 116 to the sample 50. In this way, the integrating device 150 functions to integrate the tunable optical signals, destroying their spatial coherence and ensuring that the multiple spatial modes of the output fiber 116 are completely filled. The use of two or more semiconductor lasers enables increases in the spectral scanning band by selecting tunable lasers that cover different sub bands of the scan band or an increase in the optical power by tuning the lasers together.

FIGS. 3A-3D show a number of examples of the tunable semiconductor lasers 200 that are used in embodiments of the inventive spectroscopy system 100.

Figure 3A:
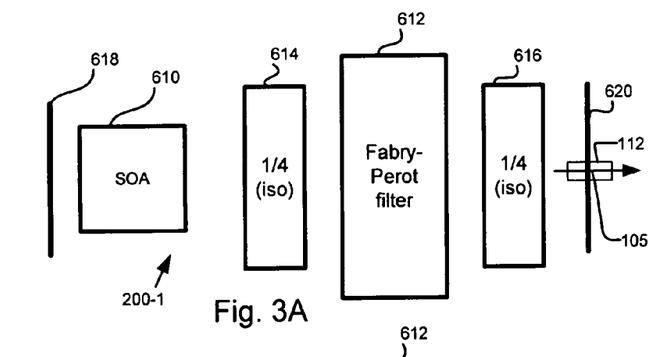
FIGS. 3A-3D illustrate a number of exemplary external cavity semiconductor tunable lasers that are compatible with the present invention.

Specifically, FIG. 3A shows a first linear cavity laser embodiment (200-1) of the tunable semiconductor laser 200. This is generally analogous to the tunable laser described in U.S. Pat. No. 6,339,603, which is incorporated herein by this reference.

Specifically, light is amplified in a semiconductor optical amplifier (SOA) 610. This light is filtered by an intracavity Fabry-Perot tunable filter 612. In one embodiment, the Fabry-Perot tunable filter is manufactured as described in U.S. Pat. No. 6,608,711 or 6,373,632, which are incorporated herein by this reference.

Out-of-band reflections from the filter 612 are isolated from being amplified in the SOA 610 by a first isolation element 614 and a second isolation element 616, on either side of the 10 filter 612 in the optical train. In different implementations, these isolation elements 614, 616 are Faraday rotators or quarterwave plates. The laser cavity is defined by a first mirror 618 and a second mirror 620. In some implementations, a reflective SOA 610 is used, which provides the reflectivity of the first mirror 618 at one end of the cavity. The tunable signal 105 is emitted through the second mirror 620 in one example.

In some embodiments, a portion of the laser cavity includes a length of the optical fiber 112. The second mirror 620 is then typically a discrete mirror or a fiber Bragg grating reflector that is formed in the fiber 112. The advantage of using the hybrid free-space/fiber laser cavity is that the laser cavity can be made long, typically longer than 10 centimeters, and preferably longer than 0.5 meters. The long cavity provides for tight longitudinal mode spacing to reduce mode-hopping noise.

In a current embodiment, the SOA chip 610 is polarization anisotropic. Thus, polarization control is desired to stabilize its operation. As such, fiber 112 is polarization controlling fiber such a polarization maintaining or is fiber that only transmits or propagates a single polarization.

Figures 3B, 3C:
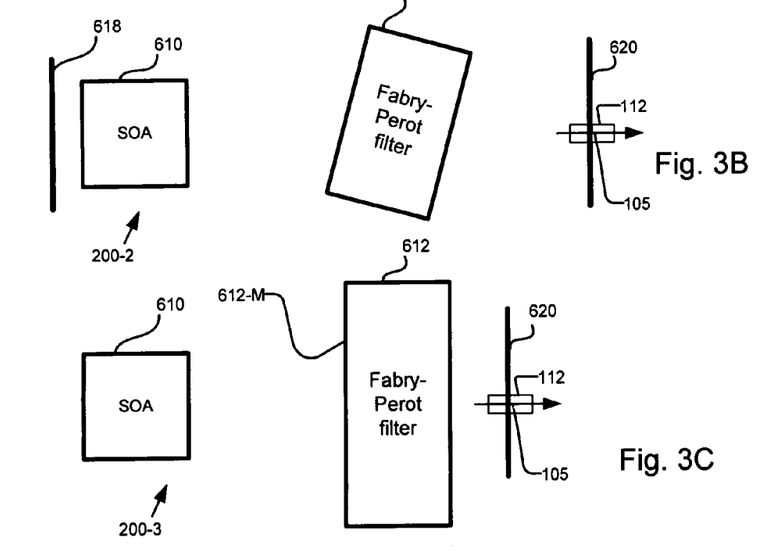

FIG. 3B shows another implementation (200-2) of the linear cavity tunable laser functioning as the tunable semiconductor source 200. Here, an SOA 610 is used in combination with a first mirror 618 and a second mirror 620. The SOA 610 is isolated from the out of passband reflection of the Fabry-Perot tunable filter 612 by tilt isolation. Typically the angle α between the optical axis OAF of the filter 612 and the optical axis of the laser cavity OAC is less than 5 degrees, and preferably between 1 and 3 degrees. Currently, angle a is about 1.3 degrees. In this way, the system generally avoids the out-of-band reflections from being amplified in the SOA 610. Preferably the tunable filter 612 has flat-flat mirror cavity to further improve isolation.

In this embodiment, a hybrid free-space/fiber cavity is used in some implementations to provide the long optical cavity/tight mode spacing characteristics by further including the fiber length 112, with the mirror 620 being formed in or attached to the fiber 112.

In a current embodiment, the SOA chip 610 is again polarization anisotropic. Thus, polarization control is desired to stabilize its operation. As such, fiber 112 is polarization controlling fiber, such as polarization maintaining or is fiber that only transmits or propagates a single polarization.

FIG. 3C shows another implementation (200-3) of the tunable semiconductor source 200. Here, feedback to the SOA 610 is provided by the first reflector 612-M of the Farby-Perot tunable filter 612 in order to generate the tunable signal 105.

Figure 3D:
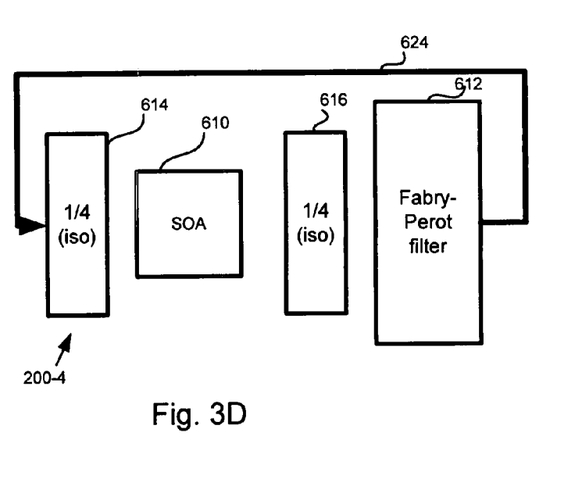

Finally, FIG. 3D shows another implementation (200-4) of the tunable semiconductor source 200. This also combines an SOA 610 and a Fabry-Perot filter 612. A ring cavity laser, however, is used. Specifically an optical fiber or bent beam path 624 is used to recirculate the light back through the SOA 610 for further amplification. Isolators or other isolation systems are provided in the beam path to ensure unidirectional light propagation through the ring.

In other embodiments, an intracavity tunable grating is used instead of the Fabry-Perot filter 612.

Figure 4:
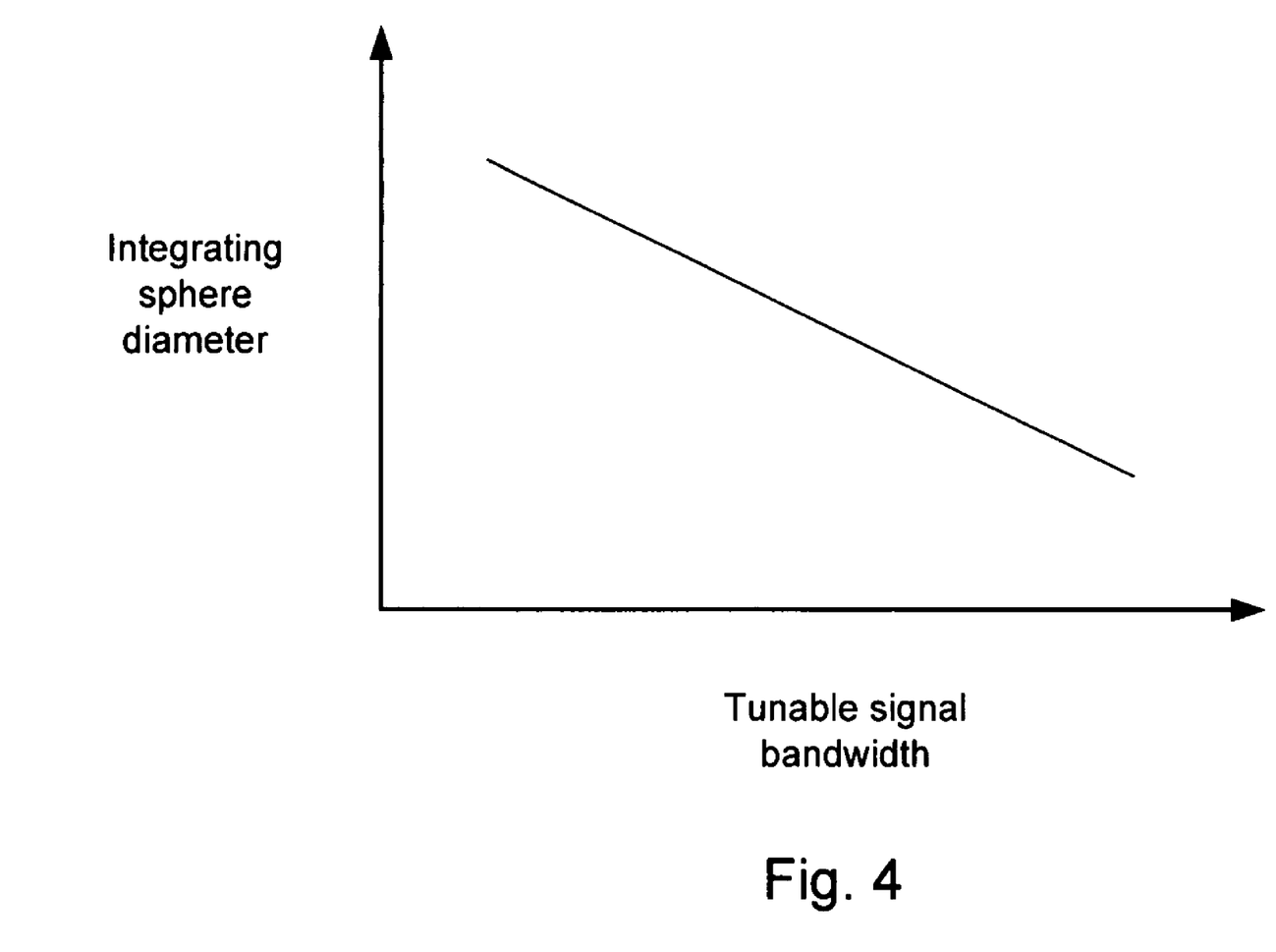
FIG. 4 illustrates a plot of integrating sphere diameter and tunable signal bandwidth, both in arbitrary units, illustrating the relationship between the integrating sphere size and the tunable signal bandwidth.

FIG. 4 generally illustrates a relationship between a diameter of the integrating sphere and the tunable signal bandwidth. Generally, integrating spheres have relatively high loss between their inputs and outputs. Typically, the loss within an integrating sphere is greater than 10 dB and can be greater than 20 dB. Generally, the larger the integrating sphere, the higher the loss.

On the other hand, the required size of the integrating sphere is related to the amount of integration that is required. For a tunable optical signal with low temporal coherence, that is shorter coherence length, a smaller size integrating sphere can be used.

In the preferred embodiment, the tunable optical signal has a coherence length of 1 to 10 millimeters, such as about 3 millimeters. Its bandwidth is greater than 0.2 nm and usually greater than 1 nanometer. As a result, the integrating sphere is less than 15 to 20 millimeters and usually less than 10 millimeters, optical length, in diameter. Preferably, the diameter of the integrating sphere is less than 5 millimeters. Note that these distances are for an air-filled sphere. Equivalent, small spheres are possible if high refractive index material is used for the sphere core.

Selecting such a small integrating sphere has two advantages. First, as described earlier, it lowers the insertion loss associated with this optical element. Further, it also contributes to the compactness of the spectroscopy system.

In other currently less preferred embodiments, the integrating sphere 150 is located optically between the sample 50 and the detector 132. In one implementation, the sphere 150 is located in the fiber link 126. In other examples, the sample 50 is located in the sphere 150 or directly optically interfaces with the sphere, i.e., no intervening optical fiber. These configurations in combination with the tunable semiconductor laser 200 function to reduce the speckle and other spectral noise. They do not have all of the advantages of the early-described embodiments, however.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A spectroscopy system, comprising:
   a tunable semiconductor laser that generates a tunable signal;
   a detector for detecting the tunable signal after interaction with a sample;
   an integrating device interposed optically between the tunable semiconductor device and the detector;
   a first optical fiber link extending between the tunable semiconductor laser and the integrating device; and
   a second optical fiber link extending between the integrating device and the detector;
   wherein the first optical fiber link is single mode fiber and the second optical link is multimode fiber.

2. A spectroscopy system as claimed in claim 1, wherein the tunable semiconductor laser comprises an external cavity tunable laser including a semiconductor optical amplifier and a laser tuning element for tuning the emission of the semiconductor optical amplifier to generate the tunable signal.

3. A spectroscopy system as claimed in claim 2, wherein the semiconductor optical amplifier comprises a reflective rear facet and an anti reflective coated front facet.

4. A spectroscopy system as claimed in claim 2, wherein the laser tuning element comprises a Fabry-Perot tunable filter.

5. A spectroscopy system as claimed in claim 2, wherein the laser tuning element comprises a microelectromechanical system Fabry-Perot tunable filter.

6. A spectroscopy system as claimed in claim 2, wherein the laser tuning element comprises a grating.

7. A spectroscopy system as claimed in claim 1, wherein the detector comprises a single element detector.

8. A spectroscopy system as claimed in claim 1, wherein the detector comprises a detector element array.

9. A spectroscopy system as claimed in claim 1, wherein the integrating device comprises a diffuse reflective element in which the tunable signal undergoes multiple reflections to be spatially and temporally integrated.

10. A spectroscopy system as claimed in claim 1, wherein the second optical link extends between the integrating device and the sample.

11. A spectroscopy system as claimed in claim 1, further comprising a power detector mounted to the integrating device for detecting a power of the tunable signal.

12. A spectroscopy system as claimed in claim 11, wherein the detected power is used to provide feedback control for the tunable semiconductor laser.

13. A spectroscopy system as claimed in claim 1, further comprising a wavelength detector mounted to the integrating device for detecting an instantaneous wavelength of the tunable signal.

14. A spectroscopy system as claimed in claim 13, wherein the detected wavelength is used to calibrate the spectroscopy system.

15. A spectroscopy system as claimed in claim 1, wherein the integrating device comprises an integrating sphere.

16. A spectroscopy system as claimed in claim 15, wherein the integrating sphere comprises a hollow volumetric region within a diffuse reflective material.

17. A spectroscopy system as claimed in claim 15, wherein the integrating sphere comprises a solid material with a diffuse reflective coating.

18. A spectroscopy system as claimed in claim 15, wherein a diameter of the integrating sphere is less than 10 millimeters in optical length.

19. A spectroscopy system as claimed in claim 15, wherein a diameter of the integrating sphere is less than 5 millimeters in optical length.

20. A spectroscopy system as claimed in claim 1, wherein a bandwidth of the tunable signal is greater than 0.2 nm.

21. A spectroscopy system as claimed in claim 20, wherein a diameter of the integrating sphere is less than 15 millimeters in optical length.

22. A spectroscopy system as claimed in claim 20, wherein a diameter of the integrating sphere is less than 10 millimeters in optical length.

23. A spectroscopy system, comprising:
   a first tunable semiconductor laser that generates a first tunable signal that is tunable over a first sub scan band;
   a second tunable semiconductor laser that generates a second tunable signal that is tunable over a second sub scan band;
   a detector for detecting the first and second tunable signals after interaction with a sample;
   an integrating device interposed optically between the tunable semiconductor devices and the sample, the integrating device for combining the first tunable signal and the second tunable signal for transmission in a common optical fiber; and an analyzer for monitoring the output of the detector to determine the spectral response of the sample over a scan band including the first and second sub scan bands.

24. A spectroscopy system as claimed in claim 23, further comprising:

a first optical fiber link extending between the first tunable semiconductor laser and the integrating device;

a second optical fiber link extending between the second tunable semiconductor laser and the integrating device; and a third optical fiber link extending between the integrating device and the detector.

25. A spectroscopy system as claimed in claim 24, wherein the first optical fiber link and the second optical fiber link are single mode fiber and the third optical link is multimode fiber.

26. A spectroscopy system as claimed in claim 25, wherein the third optical link extends between the integrating device and the sample.

27. A spectroscopy system as claimed in claim 23, wherein the integrating device comprises an integrating sphere.

28. A spectroscopy system as claimed in claim 23, wherein a diameter of the integrating sphere is less than 20 millimeters in optical length.

29. A spectroscopy system as claimed in claim 23, wherein a diameter of the integrating sphere is less than 10 millimeters in optical length.

30. A spectroscopy method, comprising:

generating a tunable signal with a tunable semiconductor laser;

coupling the tunable signal into single mode optical fiber;

destroying coherence of the tunable signal after coupling the tunable signal into the single mode fiber;

after destroying the coherence of the tunable signal, coupling the tunable signal into multimode fiber; and detecting the incoherent tunable signal after interaction with a sample.

* * * * *